(No Model.) 3 Sheets—Sheet 1.
W. & J. W. PEDIGO.
HAY TEDDER AND COCKER COMBINED.
No. 335,618. Patented Feb. 9, 1886.

Witnesses:
M. H. Anderson.
R. H. Orwig.

Inventors: William Pedigo,
Jesse W. Pedigo.
By Thomas G. Orwig, Atty.

(No Model.)　　　　　　　　　　　　　　　　　3 Sheets—Sheet 2.
W. & J. W. PEDIGO.
HAY TEDDER AND COCKER COMBINED.

No. 335,618.　　　　　　　　　Patented Feb. 9, 1886.

Witnesses:
M. H. Anderson,
R. H. Orwig.

Inventors: William Pedigo,
Jesse W. Pedigo.
By Thomas G. Orwig, Atty.

(No Model.) 3 Sheets—Sheet 3.
W. & J. W. PEDIGO.
HAY TEDDER AND COCKER COMBINED.
No. 335,618. Patented Feb. 9, 1886.
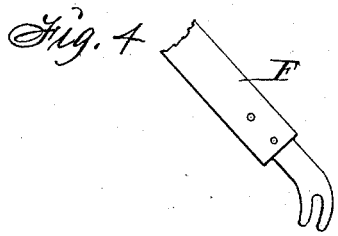
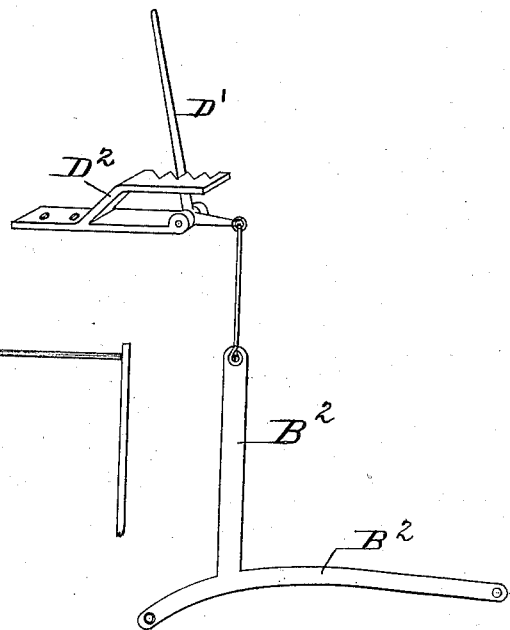
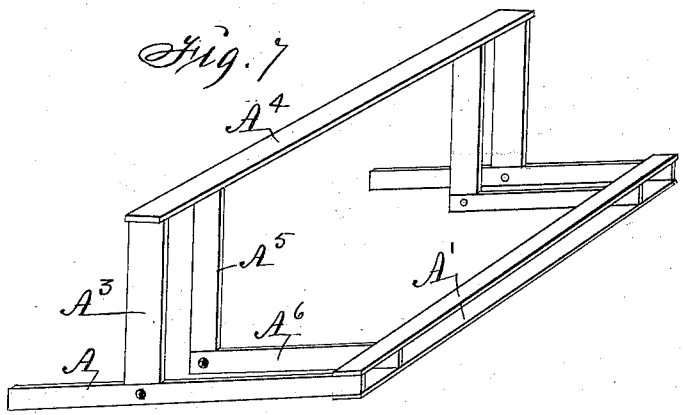

UNITED STATES PATENT OFFICE.

WILLIAM PEDIGO AND JESSE W. PEDIGO, OF NORWOOD, IOWA.

HAY TEDDER AND COCKER COMBINED.

SPECIFICATION forming part of Letters Patent No. 335,618, dated February 9, 1886.

Application filed May 25, 1885. Serial No. 166,625. (No model.)

*To all whom it may concern:*

Be it known that we, WILLIAM PEDIGO and JESSE W. PEDIGO, citizens of the United States of America, and residents of Norwood, in the county of Lucas and State of Iowa, have invented a Hay Tedder and Cocker Combined, of which the following is a specification.

Our object is to save labor and expense in making hay; and our invention consists in the construction and combination of mechanisms for spreading grass, gathering hay, elevating hay, and forming, carrying, and dumping hay-cocks, as hereinafter set forth, pointed out in our claims, and illustrated in the accompanying drawings, in which—

Figure 1:
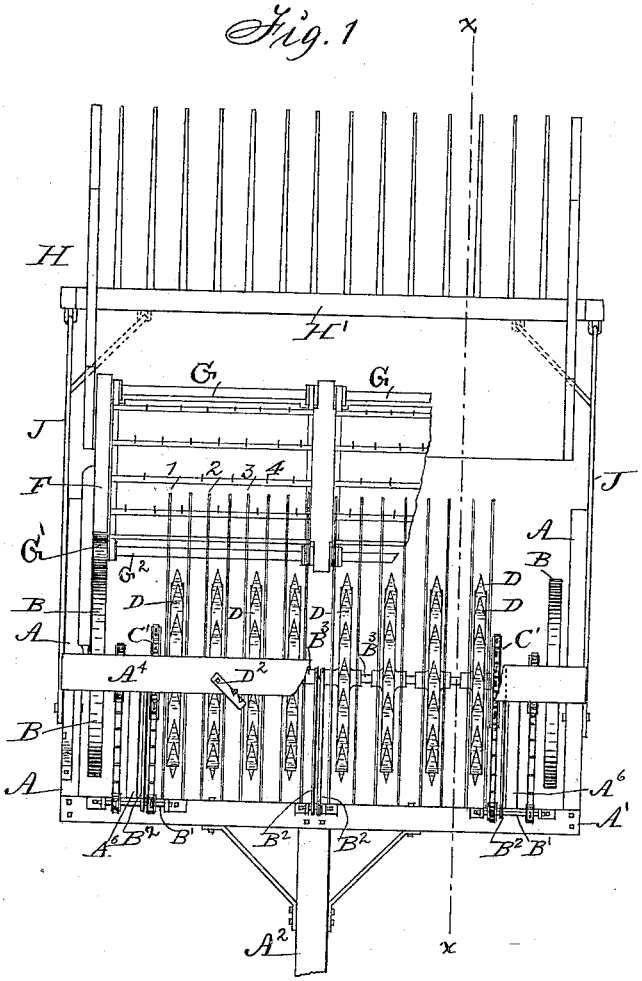
Figure 2:
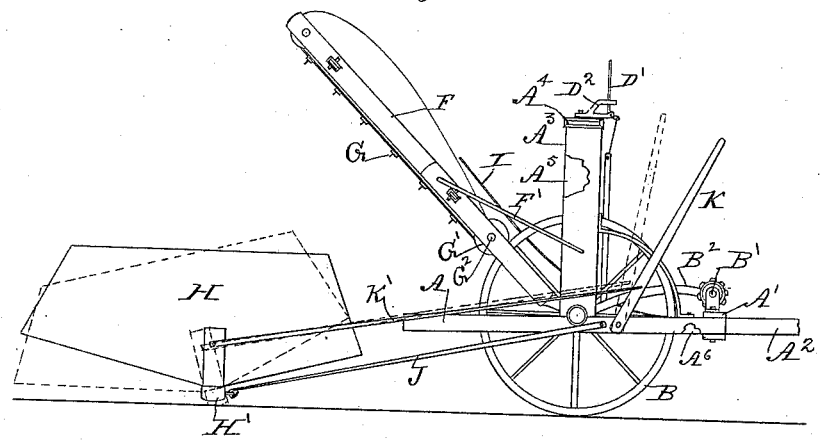

Figure 1 is a top or plan view of our machine; Fig. 2, a side view, and Fig. 3 a view looking to the right from the dotted line $x\,x$ in Fig. 1. Fig. 4 is a section of one of the side bars of the elevator-frame having a forked end. Fig. 5 is a side view of the suspended tedder-frame and a perspective view of the device by which it is supported when elevated and inoperative. Fig. 6 is a front view of the vertical portion of the suspended tedder-frame. Fig. 7 is a perspective view of the main frame of the machine.

A A are the side pieces of a rigid carriage-frame. They are connected at their front ends by a cross-piece, A', to which a pole, A$^2$, is fixed.

A$^3$ are upright pieces fixed to the side pieces, A, and connected at their top ends by means of a cross-piece, A$^4$. A$^5$ are uprights in parallel position with the uprights A$^3$, and fixed to the cross-pieces A$^4$ at their top ends, and to the cross-piece A' at their lower ends by means of short pieces A$^6$, that extend parallel with the front ends of the side pieces, A.

B B are traction-wheels fixed to short axles that have their bearings in the parallel pieces A and A$^6$.

Figure 3:
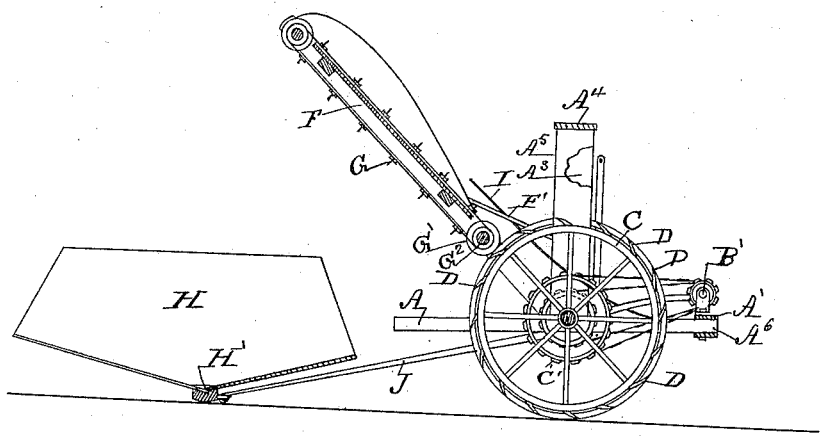

B' are short rotating shafts in bearings fixed to the front cross-piece, A', connected with the carriage-axles and wheels B by means of chain-wheels and chains, as clearly shown in Fig. 3.

B$^2$ are frames hinged to the front cross-piece, A', to support rotating axles B$^3$, to each of which axles are fixed a series of wheels, C, and one chain-wheel, C'. These chain-wheels C' are connected with the rotating shafts B', as clearly shown in Fig. 3, in such a manner that the motion transmitted from the carriage axles and wheels B to the shafts B' will be transmitted from the shafts B' to the axles B$^3$ and wheels C, and at the same time reduced in speed by the difference of the diameters of the chain-wheels on the carriage-axles and the axles B. A series of teeth, D, project tangentially from the peripheries of the wheels C in such a manner that they will slip under the grass or hay upon the ground, as they are rotated at a slower speed than the carriage-wheels while the machine is advancing. The grass or hay thus engaged by the teeth adheres to the wheels C and is elevated on their rear sides as they revolve forward.

D' are elbow-shaped levers pivoted to bearings fixed to the top cross-piece, A$^4$, and connected with the hinged frames B$^2$ in such a manner that the frames and wheels C can be readily elevated and suspended thereby by means of racks D$^2$, adapted to engage the levers as required, to make the wheels C inoperative when the machine is advanced to and from a field.

1 2 3 4 represent a series of rods or tines fixed to the front cross-piece in such a manner that they will extend rearward and upward at the sides of the wheels C, to serve as fenders to restrict the grass or hay from passing forward over the tops of the wheels.

F F are the side pieces of an elevator-frame, that have forks formed on or fixed to their lower ends to adapt them to stride the hubs of the carriage-wheels B.

F' are rods pivoted to the central portions of the side pieces F and detachably connected with the uprights A$^3$ of the carriage-frame by means of hooks on the ends of the rods, and perforations or eyes formed in or fixed to the uprights.

G G represent endless carriers mounted in the elevator-frame.

G' are friction-wheels fixed to the lower shafts, G$^2$, of the elevators in such a manner that they will engage the carriage-wheels B as required, to transmit motion from the carriage-wheels to the endless carriers when the machine is advanced in a hay-field to gather and cock hay. The series of tines 1 2 3, that restrict the upward movement of the hay when the elevator is in place, direct the hay to the endless carriers as it is separated from the wheels C.

H represents a hay carrier, dump, and cocker fixed on top of a cross-bar, H', that is adapted to slide upon the ground, and that is detachably connected with the side pieces A of the carriage by means of arms J, fixed to the ends of the bar H', as shown in Fig. 2.

K is a lever of the second order, pivoted to the side piece A, and connected with the end of the carrier and dump H by means of a rod, K', in such a manner that the carrier can be tilted rearward, as indicated by dotted lines in Fig. 2, for the purpose of emptying the hay that has been dropped therein from the elevator, as required, to produce hay-cocks.

From the foregoing description of the construction and function of each element and sub-combination of our machine the unitary actions of all the parts and the practical operation and utility of our complete invention will be obvious to mechanics and farmers who may desire to construct and use it.

When we wish to use the machine as a tedder for scattering cut grass, we detach the elevator and hay carrier and dump and allow the grass to fall and scatter as it drops from the teeth of the wheels C and the fenders that restrict the elevation of the grass and aid in disengaging it from the wheels.

We are aware that frames similar to our main carriage-frame have been used for carrying hay-tedder mechanism; but our manner of hinging auxiliary elbow-shaped frames to the front cross-bars of a rigid frame to carry tedder-wheels between the traction-wheels, for the purpose of lifting grass and hay upward and backward as the wheels revolve forward between tines fixed to the same front cross-bars to extend rearward, is novel and advantageous.

We are aware that a revolving rake has been combined with a carriage and a series of tines and an elevator in such a manner that the rake advanced hay over the tines; but our manner of constructing wheels having teeth extending tangentially from their peripheries and combining them with a carriage, an elevator, and tines in such a manner that the hay will be advanced from the wheels to the elevator under the tines, is novel and advantageous.

We claim as our invention—

1. The carriage composed of the side pieces, A, the cross-pieces A' and A$^4$, the parallel uprights A$^3$ and A$^5$, and the wheels B, the hinged frames B$^2$, carrying axles B$^3$, and fixed wheels C, having teeth D, extending tangentially from their peripheries, arranged and combined to operate in the manner set forth, for the purposes stated.

2. The combination of a carriage having traction-wheels at its sides, and an arch extending above and between the two wheels, and a hinged frame carrying a rotating axle having a series of fixed wheels having teeth D, extending tangentially from their peripheries, and mechanism to transmit motion from the carriage-wheels to the rotating axle suspended in the hinged frame, for the purposes stated.

3. The carriage-frame A A' A$^3$ A$^4$ A$^5$, the wheels B, fixed to short axles, two chain-wheels of different diameters fixed to the axles of the wheels B, one or two suspended frames carrying axles B$^3$, and wheels C, having teeth D, shafts B', having fixed chain-wheels, and chains connecting the chain-wheels, as the carriage-axles with the shafts B, substantially as and for the purposes stated.

4. The series of tines 1 2 3 4, in combination with the cross-piece A' of the carriage-frame, and the wheels C, having teeth D, extending tangentially from their peripheries, substantially as and for the purposes stated.

5. The hay-carrier and dump H H, having arms J, in combination with a carriage having hinged frames B$^2$, carrying axles B$^3$, having fixed wheels C, provided with teeth D, and the elevator G F, substantially as and for the purposes stated.

6. The hay-making machine composed of a carriage having an arched frame, hinged frames carrying rotating axles, and fixed wheels having tangential teeth on their peripheries, a series of tines projecting from the front of the carriage-frame rearward and upward between the wheels and their tangential teeth, a detachable elevator, and an adjustable and detachable hay carrier and cocker, substantially as shown and described, to operate in the manner set forth.

WILLIAM PEDIGO.
JESSE W. PEDIGO.

Witnesses:
A. W. McCORMICK,
W. S. LONG.